US009926801B2

United States Patent
Uskert et al.

(10) Patent No.: US 9,926,801 B2
(45) Date of Patent: Mar. 27, 2018

(54) BLADE TRACK ASSEMBLY WITH TURBINE TIP CLEARANCE CONTROL

(71) Applicant: Rolls-Royce Corporation, Indianapolis, IN (US)

(72) Inventors: Richard C. Uskert, Timonium, MD (US); Joseph P. Lamusga, Indianapolis, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1132 days.

(21) Appl. No.: 14/137,422

(22) Filed: Dec. 20, 2013

(65) Prior Publication Data

US 2015/0003958 A1    Jan. 1, 2015

Related U.S. Application Data

(60) Provisional application No. 61/786,187, filed on Mar. 14, 2013.

(51) Int. Cl.
| | |
|---|---|
| *F01D 11/24* | (2006.01) |
| *F01D 11/22* | (2006.01) |
| *F01D 25/24* | (2006.01) |

(52) U.S. Cl.
CPC .............. *F01D 11/24* (2013.01); *F01D 11/22* (2013.01); *F01D 25/246* (2013.01); *F05D 2240/11* (2013.01); *Y02T 50/672* (2013.01)

(58) Field of Classification Search
CPC ........ F01D 25/246; F01D 11/18; F01D 11/22; F01D 11/20; F01D 11/24
See application file for complete search history.

(56) References Cited

U.S. PATENT DOCUMENTS

| | | | |
|---|---|---|---|
| 3,085,398 | A | 4/1963 | Fredrick |
| 4,127,357 | A | 11/1978 | Patterson |
| 4,527,385 | A | 7/1985 | Jumelle et al. |
| 4,779,436 | A | 10/1988 | Schwarze |
| 4,863,345 | A | 9/1989 | Thompson et al. |

(Continued)

FOREIGN PATENT DOCUMENTS

| | | |
|---|---|---|
| EP | 1655455 A1 | 5/2006 |
| GB | 2068470 A | 8/1981 |

OTHER PUBLICATIONS

International Search Report for PCT International Application Serial No. PCT/US2013/077030, completed Apr. 17, 2014, (9 pages).

*Primary Examiner* — Woody Lee, Jr.
*Assistant Examiner* — Maxime Adjagbe
(74) *Attorney, Agent, or Firm* — Barnes & Thornburg LLP

(57) ABSTRACT

An apparatus and method for controlling turbine blade tip clearance is disclosed herein. A blade track assembly can include a blade track carrier having a plurality of slots and rails defined by paths that vary in radial position as a function of circumferential location. An expansion ring can be operably coupled with the slots of the blade track carrier. A plurality of blade track segments can be operably coupled with the expansion ring and engageable with the rails of the blade track carrier such that expansion and contraction of the expansion ring causes radially outward movement and radially inward movement, respectively, of the blade track segments.

18 Claims, 4 Drawing Sheets

(56) References Cited

U.S. PATENT DOCUMENTS

| | | | |
|---|---|---|---|
| 5,167,487 A | * | 12/1992 | Rock .................. F01D 11/18 415/173.1 |
| 5,330,321 A | | 7/1994 | Roberts et al. |
| 5,593,278 A | | 1/1997 | Jourdain et al. |
| 5,993,150 A | | 11/1999 | Liotta et al. |
| 6,048,170 A | | 4/2000 | Dodd |
| 6,382,905 B1 | | 5/2002 | Czachor et al. |
| 6,510,374 B1 | | 1/2003 | Saotome et al. |
| 6,935,836 B2 | | 8/2005 | Ress et al. |
| 7,210,899 B2 | | 5/2007 | Wilson |
| 7,422,413 B2 | | 9/2008 | Matheny |
| 7,563,071 B2 | | 7/2009 | Campbell et al. |
| 7,740,443 B2 | | 6/2010 | Seitzer et al. |
| 2006/0165518 A1 | | 7/2006 | Albers et al. |

* cited by examiner

BLADE TRACK ASSEMBLY WITH TURBINE TIP CLEARANCE CONTROL

CROSS REFERENCE TO RELATED APPLICATIONS

This application claims priority to and the benefit of U.S. Provisional Patent Application No. 61/786,187, filed 14 Mar. 2013, the disclosure of which is now expressly incorporated herein by reference.

FIELD OF THE INVENTION

The present disclosure relates to a blade track assembly for a turbine rotor in a gas turbine engine. More particularly, the present disclosure relates to a blade track assembly having a mechanism to adjust a tip clearance between a turbine blade tip and a blade track.

BACKGROUND

Gas turbine engine designers continuously work to improve engine efficiency. The specific fuel consumption (SFC) of an engine is inversely proportional to the overall thermal efficiency of the engine, thus, as the SFC decreases the fuel efficiency of the engine increases. The thermal efficiency of a turbofan engine is a function of component efficiencies, cycle pressure ratio, and turbine inlet temperature. Any leakage of core flow around turbine blades between a tip and a blade track will reduce the efficiency of the turbine. Minimizing the tip clearance with fixed geometry turbine blade track assemblies is difficult because at some operating conditions the turbine blade may rub the blade track causing damage to the components. Some existing gas turbine blade track assemblies have various shortcomings, drawbacks, and disadvantages relative to certain applications. Accordingly, there remains a need for further contributions in this area of technology.

SUMMARY

One embodiment of the present disclosure is a unique blade track assembly operable for controlling a turbine blade tip clearance. Other embodiments include unique apparatuses, systems, devices, hardware, methods, and combinations for gas turbine engine blade track assemblies. Further embodiments, forms, features, aspects, benefits, and advantages of the present application shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
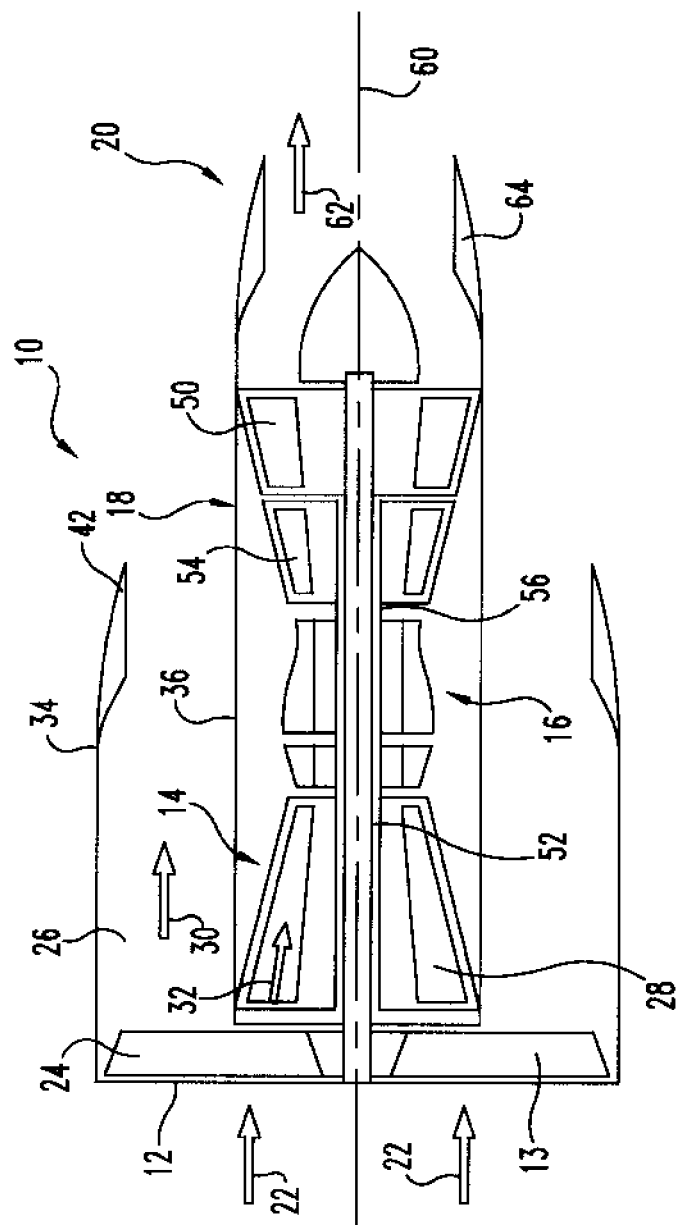
FIG. 1 is a schematic cross-sectional side view of a turbofan engine according to an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

When the terms "upper and lower" or similar words describing orientation or relative positioning are used in this disclosure, it should be read to apply to the relative location in a particular view and not as an absolute orientation of a particular portion of a blade track assembly as defined herein.

Referring to FIG. 1, a schematic view of a gas turbine engine configured as a turbofan engine 10 is depicted. While the turbofan engine 10 is illustrated in simplistic schematic form, it should be understood that the present disclosure including a novel blade track assembly is not limited to any particular engine design or configuration and, as such, may be used with any form of gas turbine engines such as turboprops, turbojets, unducted fan engines, and others having a range of complexities including multiple spools (multiple turbines operationally connected to multiple compressors), variable geometry turbomachinery, and in commercial or military applications. Further, the novel blade track assembly defined by the present disclosure can be used in other systems that operate in hot environments wherein cooling of certain components is required to provide structural and operational integrity. The systems can include other forms of gas turbine engines such as those for generating electric power, fluid pumping applications, land vehicle, and watercraft propulsion.

The turbofan engine 10 will be described generally as one embodiment of the present disclosure, however significant details regarding gas turbine engine design and operation will not be presented herein as it is believed that the theory of operation and general parameters of gas turbine engines are well known to those of ordinary skill in the art. The turbofan engine 10 includes an inlet section 12, a fan section 13, a compressor section 14, a combustor section 16, a turbine section 18, and an exhaust section 20. In operation, air illustrated by arrows 22 is drawn in through the inlet 12 and passes through at least one fan stage 24 of the fan section 13 where the ambient air is compressed to a higher pressure. After passing through the fan section 13, the air can be split into a plurality of flowstreams. In this exemplary embodiment, the airflow is spilt into a bypass duct 26 and a core passageway 28. Airflow through the bypass duct 26 and the core passageway 28 is illustrated by arrows 30 and 32 respectively. The bypass duct 26 encompasses the core passageway 28 and can be defined by an outer circumferential wall 34 and an inner circumferential wall 36. The bypass duct 26 can also include a bypass nozzle 42 operable for creating a pressure differential across the fan 24 and for accelerating the bypass airflow 30 to provide bypass thrust for the turbofan engine 10.

The core airflow 32 enters the core passageway 28 after passing through the fan section 13. The core airflow is then further compressed in the compressor section 14 to a higher pressure relative to both ambient pressure and the air pressure in the bypass duct 26. The air is mixed with fuel in the combustor section 16 wherein the fuel/air mixture burns and produces a high temperature working fluid from which the turbine section 18 extracts power. The turbine section 18 can include a low pressure turbine 50 mechanically coupled to the fan section 13 through a low pressure shaft 52 and a high pressure turbine 54 mechanically coupled to the compressor section 14 through a high pressure shaft 56. The shafts 52, 56 rotate about a centerline axis 60 that extends axially along the longitudinal axis of the engine 10, such that as the turbine section 18 rotates due to the forces generated by the high pressure working fluid, the fan section 13 and compressor section 14 section are rotatingly driven by the turbine section 18 to produce compressed air. After passing through the turbine section 18, the core flow represented by arrow 62 is accelerated to a high velocity through a core exhaust nozzle 64 to produce thrust for the turbofan engine 10.

Figure 2:
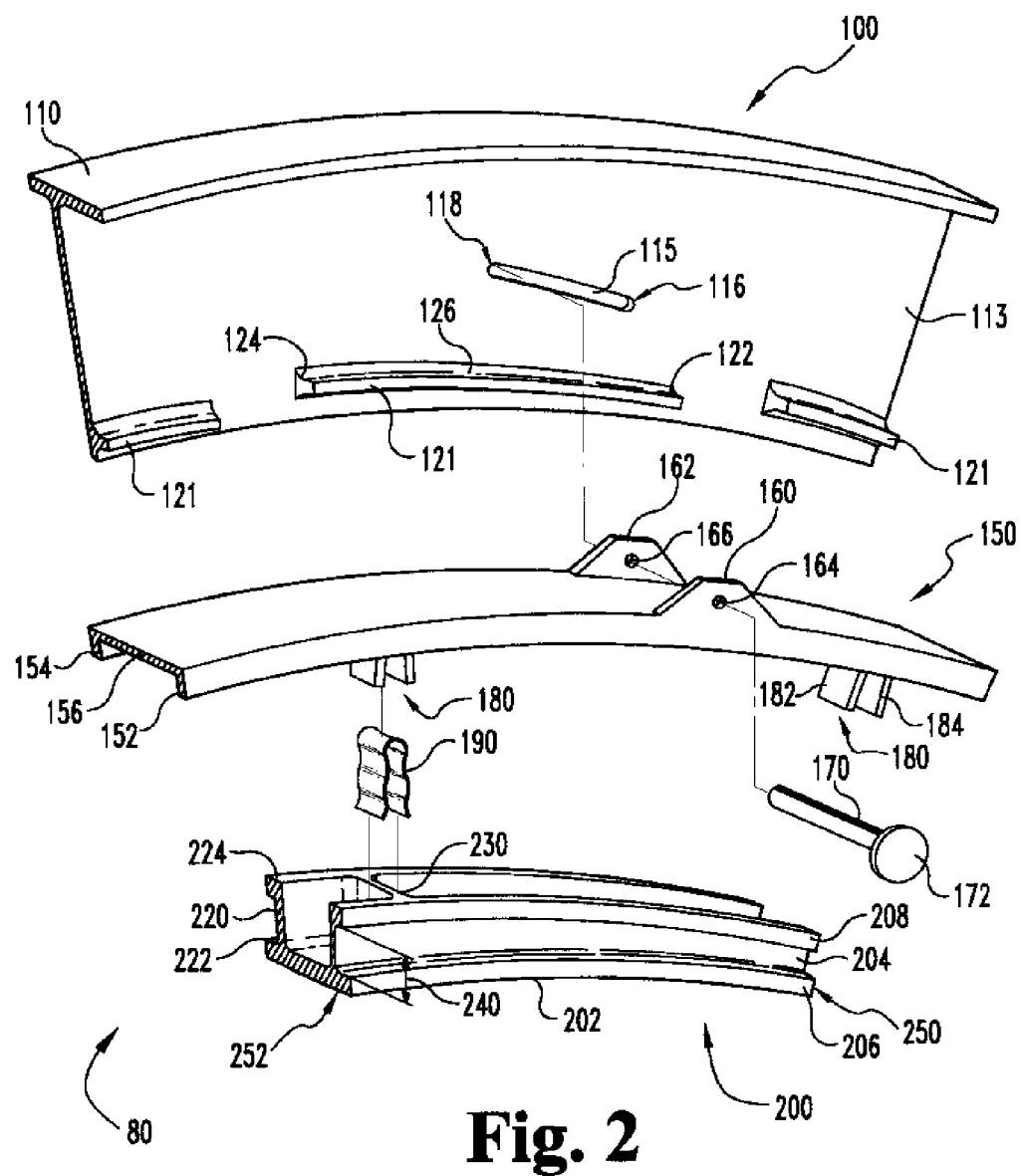
FIG. 2 is an exploded perspective view of a blade track assembly according to an embodiment of the present disclosure.

Referring now to FIG. 2, an adjustable turbine blade track assembly 80 is illustrated. The distance between the turbine blade tips and an inner shroud wall is called the turbine blade tip clearance or sometimes just "tip clearance." The tip clearance provides a "leak path" for the hot exhaust gasses to flow around the turbine blades without delivering useful work into the turbine rotor. Exhaust gas leakage causes a reduction in turbine efficiency and therefore reduces overall engine fuel efficiency. The problem that challenges turbine designers is that the turbine rotor and the blade tracks move during engine operation due to high temperature thermal growth, component deflections due to pressure forces and other loading inputs. Therefore the turbine blades and blade tracks cannot be designed to minimize blade tip clearance under normal ambient conditions with no loading and remain in their relative positions during all operational conditions of the gas turbine engine 10. At some operating conditions, the tip clearance may grow too wide such that the turbine efficiency is reduced and, at other conditions, there may actually be contact between the rotating turbine blades and the inner shroud wall of the blade track which will damage both components and potentially require costly refurbishment. The turbine blade assembly 80 of the present disclosure overcomes this problem by controlling the location of the inner shroud wall of the blade tracks during engine operation as will be described in more detail below.

The adjustable blade track assembly 80 includes a blade track carrier 100, an expansion ring 150, and a plurality of blade track segments 200 operationally coupled together to provide a variable clearance between turbine blade tips (not shown) and a blade track or shroud. The blade track carrier 100 circumferentially extends around a turbine rotor stage (not shown in the drawings) and can include a top wall 110 formed to a thickness such that the blade track carrier 100 can carry loads into a static structure of the aircraft engine 10. The blade track carrier includes a first side wall 112 and a second side wall 113 extending radially inward from the top wall 110. The first side wall 112 is removed from this view (see FIG. 3) so that internal features of the blade track carrier can be seen. It should be understood that both the first side wall 112 and second side wall 113 can be essentially mirror images of one another and that the features described with respect to the second side wall 113 can also be included on the first side wall 112. The second side wall 113 can include a through slot 115 having a first end 116 positioned radially inward from an opposing second end 118.

The formation path of the through slot 115 can be configured in a variety of ways such as with linear or arcuate pathways. In one form, the slot 115 is defined by a spiral shape relative to the axis of rotation 60 as shown in FIG. 1. The blade track carrier 100 also includes a plurality of second rails 121 connected to the second sidewall 113. The rails 121 include a first end 122 positioned radially inward from the opposing second end 124. A bearing surface 126 extends between the first and second ends 122, 124, respectively. The rails 126 can be formed in any desirable path such as linear or arcuate similar to the path of the through slot 115. Each rail 121 can include a corresponding through slot 115 that works via a system of moving components to control a clearance between turbine blade tips and blade tracks during operation of the gas turbine engine 10 as will be describe in detail below. Alternatively, the blade track carrier 100 can include a different number of through slots 115 than the number of rails 121.

In one form, the path of the rail is defined by a spiral shape relative to the axis of rotation 60. The blade track carrier includes a plurality of through slots 115 and rails 121 to correspond to the number of blade track segments 200 used in the blade track assembly 80. There may be an equal or unequal number of corresponding through slots 115, rails 121, and blade track segments 200 depending on the design configuration of the blade track assembly 80. The path of the through slots 115 and the path of the corresponding rails can be substantially similar. However, the expansion ring 150 and blade track segments may be formed in such a way as to permit variations in the paths and still provide a desired blade tip clearance at defined operating conditions of the gas turbine engine 10. Also, the path of the through slot 115 and the path of the rail 121 is illustratively a spiral shape. At times throughout this disclosure reference will be made to a spiral slot and/or a spiral rail, but it is not intended to be limiting and, to the contrary, the spiral configuration is only one embodiment of many possible configurations.

Although the expansion ring 150 is shown in segmented form, the expansion ring 150 is illustratively a complete 360 degree hoop. The expansion ring 150 has first and second side walls 152, 154 spaced apart by a platform 156. The first and second walls 152, 154 can act as thermal shields, as will be described in more detail below. A first boss 160 and a second boss 162 can extend radially outward from the first and second side walls 152, 154, respectively. The number of first and second bosses 160, 162 corresponds with the number of through slots 115 formed in the blade track carrier 100 as they are operationally coupled to one another. Each boss 160, 162 can include a through hole 164, 166 formed therein, respectively.

Figure 3:
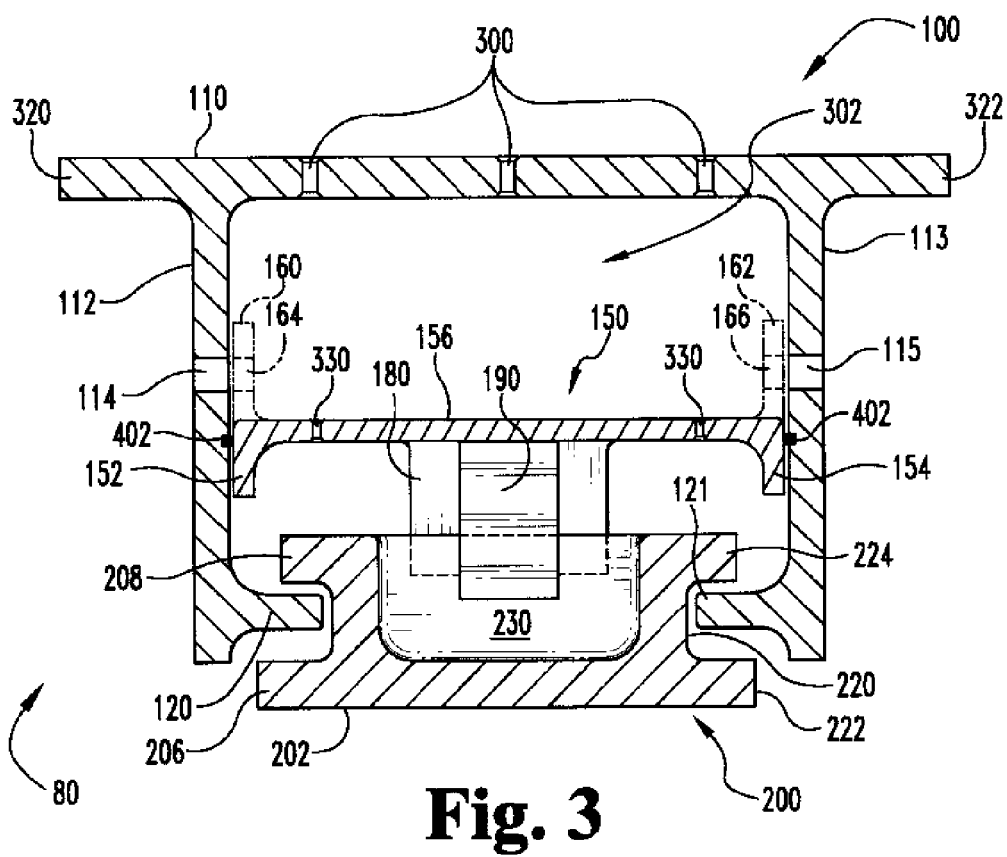
FIG. 3 is a cross-sectional view of the blade track assembly in an assembled position according to an embodiment of the present disclosure.

A locating pin 170 can extend through a first slot 114 in the first sidewall 112 of the blade track carrier 100 (removed in FIG. 2 for clarity but shown in FIG. 3). The locating pin 170 then extend through each of the holes 164, 166 of first and second bosses 160,162. The locating pin 170 can then extend through the second slot 115 of the blade track carrier 100. A pin head 172 can be formed on one end thereof to hold the pin 170 in place and, although not shown, a second pin head or other retaining feature can be connected to the other end after assembly to prevent the pin 170 from inadvertent removal. In this manner the expansion ring 150 can be operationally coupled to the blade track carrier 100.

While the pair of bosses 160, 162 and pin 170 connection to the slots 114, 115 are illustrated as an exemplary embodiment, the present disclosure should not be limited to such a configuration. Any other configuration or design operable to couple the expansion ring to the slots 114, 115 should be considered as within the scope of the description and the claims of the disclosure.

A plurality of tabs 180 are formed from and extend radially inward from the platform 156 of the expansion ring 150. Each tab 180 can include a first projection 182 and a second projection 184 spaced apart from one another. A compliant clip 190 such as one made of corrugated metal sheet can be inserted between the projections 182, 184 of the tabs to provide a compliant wear material to engage with a blade track segment 200. Alternatively or in addition to compliant wear members such as washers, spacers, clips and the like, coatings can also be applied to surfaces of engaged portions of the blade track assembly 80. The coatings can include anti-fret coatings with dry film lubrication properties and the like. Other coatings may also be applied anywhere desired on the blade track assembly 80 such as thermal barrier coatings for high temperature areas and/or environmental barrier coatings for corrosion resistance.

Each blade track segment 200 includes an inner shroud wall 202 for extending across and radially outward of a plurality of turbine blade tips extending from a turbine rotor (not shown). Each inner shroud wall 200 of the blade track segments 200 may be located as close to the blade tips as possible without actually touching, at all operational conditions of the engine 10. A first wall 204 of each blade track segment 200 projects radially outward from the inner shroud wall 202 and extends between a first inner rail follower 206 and a first outer rail follower 208. A second wall 220 spaced apart from the first wall also projects radially outward from the inner shroud wall and extends between a second inner rail follower 222 and a second outer rail follower 224.

A groove height represented by double arrow 240 can be defined as the distance between the inner and outer rails of the first and second walls 204, 220. Each of the rail followers, 206, 208, 222, 224 and the walls 204, 220 extend along a longitudinal direction between first and second ends 250, 252, respectively, of each blade track segment 200. The groove height 240 can be consistent throughout the length between the first and second ends 250, 252 or alternatively can vary such that the spacing between inner and outer rail followers 206, 208 and 222, 224 change along the length thereof.

The blade track segment 200 can include a bridge 230 extending laterally between the first and second walls 204, 220 respectively. The bridge 230 of the blade track segment 200 is configured to engage with a corresponding tab 180 of the expansion ring 150. In some embodiments, a compliant clip 190 and/or a wear coating can be positioned between the tabs 180 and the corresponding bridges 230 of the blade track segments 200. The tabs 180 are operable to urge the corresponding blade track segments 200 to move generally in a circumferential direction as the expansion ring 150 expands and contracts in response to temperature changes, as will be described in more detail below.

Referring now to FIG. 3, a cross-sectional view of the blade track assembly 80 is shown in an assembled condition to illustrate operational features and engagement positions of the various components including the blade track carrier 100, the expansion ring 150, and the blade track segment 200. The top wall 110 of the blade track carrier 100 can include first and second connecting arms 320, 322 extending laterally outward from the first and second side walls 112, 113. The top wall 110 can also include one or more impingement holes 300 for providing cooling fluid and the like to a distribution plenum 302 formed in a space between the blade track carrier 100 and the expansion ring 150. From there, the cooling fluid can pass through the platform 156 of the expansion ring 150 through one or more cooling feed holes 330 to cool the blade track segments 200 or other components in the turbine assembly 80. One or more seals 402 can be positioned between the first and second walls 152, 154 of the expansion ring 150 and the sidewalls 112, 113 of the blade track carrier 100. The seals 402 can prevent cooling fluid from leaking from the plenum 302 through the space between the sidewalls 152, 154 of the expansion ring 150 and the sidewalls 112, 113 of the blade track carrier 100.

The expansion ring 150 is operable to expand and contract as desired by providing a cooling fluid flow into the distribution plenum 302 and thereby controlling the temperature of the expansion ring 150. As the expansion ring heats or cools, it will expand and contract according to the thermal expansion coefficient of the material used to make the expansion ring 150. The temperature and, therefore the diameter, of the expansion ring 150 can be controlled by a temperature control system. The temperature control system (not shown in detail in the drawings) can include a source of cooling fluid, one or more temperature sensors to determine the temperature of the cooling fluid and/or the temperature of the expansion ring 150, one or more electronic flow control valves to control a flow rate of the cooling fluid and an electronic controller operably connected to the temperature sensors, and the flow control valves. The electronic controller can also be operationally connected to other control units and other electronic systems on the aircraft engine. The controller can control the size of expansion ring 150 by controlling the cooling flow rate and/or the cooling flow temperature though various electronic controlled valves as would be known to one skilled in the art.

The desired temperature and size of the expansion ring 150 can be determined experimentally and provided in electronic lookup tables or the like. Alternatively, sensors such as proximity sensors may be used to actively determine the actual turbine operating tip clearance and, in conjunction with predictive algorithms for transient inputs and the like, the controller can determine the amount of cooling fluid to provide to the blade track assembly 80. In an alternative embodiment, a complete control system is not required as the component configurations and thermal expansion coefficients of the various materials can be designed for passive control wherein the cooling fluid flow is not actively controlled with electronic control valves, but controlled through passive orifice control apertures and the like. The cooling fluid source can include tapping into the compressor section 14 or alternatively tapping into other sources such as ambient air pressured by a separate pump or other means.

While not shown in detail in the disclosed embodiments, the cooling fluid can flow from the distribution plenum 302 through the cooling feed holes 330 of the platform 156 and can then be fed into passageways (not shown) of each blade track segment 200 to provide cooling thereto. Furthermore additional cooling holes can be formed on the inner shroud wall 202 such that the cooling flow can egress into the exhaust flow stream and provide a film cooling to the inner shroud wall 202.

As the expansion ring 150 contracts or expands, it will be forced to follow along the path defined by the spiral slots 114, 115 formed in the side walls 112, 113 of the blade track carrier 100 because of connections made through the locating pins 170. It can be seen (best in conjunction with FIG.

2) that as the expansion ring 150 expands, it will move from the first ends 116 of the slots 114, 115 towards the second ends 118 of the slots 114, 115 such that the expansion ring 150 moves in a circumferential direction (counter clockwise in FIG. 2) in proportion to the radially outward expanding direction. As the expansion ring 150 rotates in a circumferential direction, the tabs 180 that are engaged with the bridge 230 of each blade track segment 200 will cause the blade track segment 200 to move in the same circumferential direction. Because the rail followers 206, 208 and 222, 224 are engaged with the bearing surface 126 of the rails 120, 121 of a corresponding rail 120, 121, respectively, the blade track segment 200 will move along a path defined by the rails 120, 121. In one embodiment, the rails are defined by a spiral path such that as the blade track segments 200 move in a circumferential direction they also move in a radial direction similar to an iris diaphragm of a camera lens. As discussed previously the path defined by the rails 120, 121 and slots 114, 115 can be substantially the same or entirely different. The paths can be defined by a substantially linear form, a plurality of constant or variable arc segments, or a spiral shaped configuration.

Figure 4:
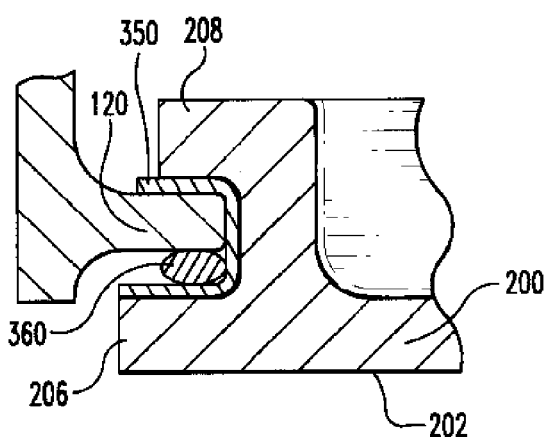
FIG. 4 is an enlarged cross-sectional view of a portion of the blade track assembly according to an embodiment of the present disclosure.

Referring now to FIG. 4, an enlarged portion of the blade track segment 200 and a corresponding rail 120 of the blade track carrier 100 is shown in an engaged position. The first inner rail follower 206 of the blade track segment 200 extends below the rail 120 of the blade track carrier 100 and the first outer rail follower 208 of the blade track segment 200 extends partially over the rail 120 of the blade track carrier 100. In this configuration, the blade track segment 200 is configured to slidingly follow along the length of the rail 120. The interface between the blade track segment 200 and the rail 120 can include a compliant wear member such as a C-shaped washer 350 and/or a dry-film lubrication coating material to facilitate sliding engagement between the surfaces. The compliant wear layer can include a plurality of coating layers, for example an anti-fret coating layer made of dry film lubrication properties and the like or as shown in this embodiment a separate washer structure that is formed in a substantially C-shaped configuration.

A seal 360 illustrated as an ovalized O-ring type structure can be placed between the rail 120 and the compliant washer 350 to prevent cooling fluid from escaping through the interface of these components. The configuration illustrated in FIG. 4 should be considered an exemplary embodiment and not a limiting embodiment. For example, the seal 360 can be made of a metal material, a ceramic material, an inter-metallic material, or combinations thereof. Further, the seal 360 can include various configurations such as a C-shaped seal or a W-shaped seal or the like and may be placed in other locations as desired. Further, the sealing arrangement may include more than one seals placed in various regions of engagement between the blade track segment 200 and the blade track carrier 100 to prevent cooling flow leakage from the distribution plenum 302 through the engagement portions of the blade track assembly 80.

Figure 5:
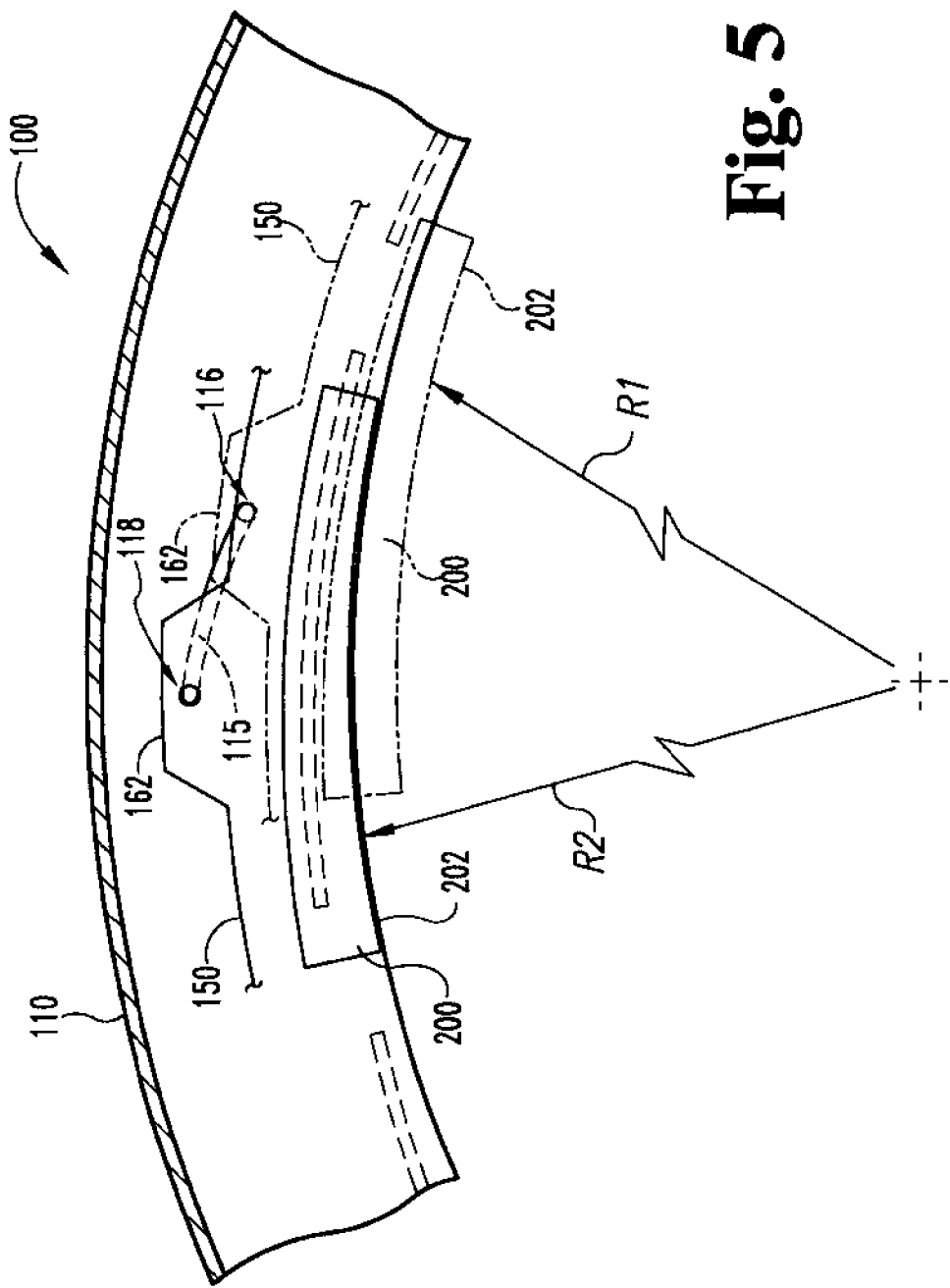
FIG. 5 is a schematic plan view of a portion of the blade track assembly showing variable positioning of a blade track according to an embodiment of the present disclosure.

Referring now to FIG. 5, a simplified illustration of the adjustable blade track assembly 80 is shown in operation. Portions of the assembled components including the blade track carrier 100, the expansion ring 150, and the blade track segment 200 have been removed to provide more clarity to the drawing. The illustration in FIG. 5 shows the blade track segment 200 in a first position in the form of a dashed outline including the inner shroud wall 202 positioned in the most radially inward position. The boss 162 in dashed outline is at the first end 116 of the slot 115 which corresponds to the radial most inward position of the slot 115. This first position is defined by the expansion ring 150 being at a relatively cold temperature and therefore in the inner most contracted position. The second position is shown in solid line form to illustrate the furthermost radially outward position of the inner shroud wall 202 of the blade track segment 200. The boss 162 in solid outline is at the second end 118 of the slot 115 which corresponds to the radial most outward position of the slot 115. This second position is defined by the expansion ring 150 being at a relatively hot temperature and therefore in the outermost expanded position.

As can be seen in the drawing the expansion ring 150 will move in a circumferential direction when expanding and contracting due to the coupling of the boss 162 with the slot 115. When the expansion ring 150 expands, it will move in a counter clockwise circumferential direction toward the second end 118 of the slot 115. When the expansion ring 150 contracts, it will move in a clockwise circumferential direction toward the first end 116 of the slot 116.

The radius R1 is illustrative of the radial distance from the engine centerline to the shroud wall 202 of the blade track segment 200 in the most radially inward position. This first position represents a relatively cold operating condition such as idle engine speed or the like. The radius R2 is illustrative of the radial distance from the engine centerline to the shroud wall 202 of the blade track segment 200 in a most radially outward position. This second position represents a relatively hot operating condition and high engine speeds such as those conditions at flight takeoff for an aircraft application or other maximum power conditions.

As described previously, each blade track segment 200 is operably connected to the expansion ring 150 such that as the expansion ring 150 expands or contracts, the blade tracks will also expand and contract. The temperature control system can control the cooling fluid temperature and flow rate entering into the distribution plenum 302 through the impingement holes 300 of the blade track carrier 100. Each blade track segment 200 will follow movement of the expansion ring 150 in a substantially spiral-like motion as defined by the path of the spiral rails 120, 121.

The pair of bosses 160, 162 formed on the expansion ring 150 is coupled to the slots 114, 115 through the locating pin 170 such that the bosses 160, 162 are permitted to move only along the pathway defined by the slots 114, 115 in the side walls 112, 113 of the blade track carrier 100. The first boss 162 can be shown in a dashed outline at the innermost radial position to the far right of the slot at the first end 116 thereof. The boss 162 is shown in the second position at the far left side of the slot at the second end 118 such that the expansion ring 150 is at its outermost radial location which corresponds the to the maximum travel point in the circumferential direction. As the blade track segments 200 slide along the bearing surfaces 126 of the spiral rails 120, 121 they can move in a substantially spiral path such that the blade track segments open and close like a diaphragm shutter of a camera.

The plurality of blade track segments 200 form a substantially continuous circular enclosure around the turbine rotor blades. While not shown in the drawings, the blade track segments 200 can have angled end walls on their first and second ends 250, 252 so as to promote a slight overlap between adjacently located blade track segments 200 to restrict core flow leakage between the blade track segments 200. It is desirable to minimize any space between adjacent blade track segments 200 so that working fluid is restricted from passing there between. The efficiency of a turbine will be degraded as a function of the percentage of working fluid lost through the passageway formed between adjacent blade track segments 200. Furthermore, in alternate embodiments expandable seals can be attached to adjacent blade track segments to further restrict working fluid from passing there between. These seals can be of any form known to those skilled in the art, but typically would be of a metallic or ceramic nature due to the extremely high temperatures of exhaust gas passing through the turbine section.

All of the features shown in the exemplary embodiments are for illustrative purposes only and may not be required for the blade track assembly 80 to operate as intended. Furthermore, other connection features and additional intermediate components may be added to promote coupling and ease of movement. For example, bearings such as roller or ball bearings can be included to promote friction reduced movement between the movable components. By way of example, the locating pins may be double walled with a roller bearing element so as to permit portions engaged with the expansion ring to rotate with respect to portions of the locating pins engaged with the blade track carrier. In another example, the surfaces of the engaged portions of the blade track assembly such as the rails, rail followers, and the like may have raised portions or bumps formed thereon so as to reduce the contact surface area and thus reduce the sliding friction inherent with relative long flat portions of components sliding relative to one another.

Various coupling features can be integrally formed with portions of the blade track assembly 80 or, alternatively, can be separate components that are mechanically connected thereto. Coatings, seals, and other features can be added or removed as desired and still fall under the teachings of this disclosure. The connecting and actuating features of the adjustable blade track assembly 80 may be modified as desired so long as the basic mechanism operates to provide an expansion ring 150 for driving the blade track segments 200 in a circumferential direction and a rail system for driving the blade tracks in a radial direction as the blade track segments are moved in a circumferential direction.

Various materials may be used for any of the components in the blade track assembly 80, such as metals, ceramics, ceramic matrix composites, inter-metallics and the like. In one form, the expansion ring 150 is formed from a metal with a relatively high coefficient of thermal expansion so that greater movement can be realized with a change in temperature. In another form, the blade track segments can be formed from a ceramic matrix composite material for increased temperature capability and high strength to weight ratio. Further, other than the expansion ring that must either be integrally formed or have fixed mechanical joined segments to form a complete 360 degree ring-like structure, the other components of the turbine blade assembly may be split or otherwise formed of separate segments as desired for ease of manufacturing, ease of assembly, or reduced costs of fabrication.

According to one aspect of the present disclosure, a turbine blade track assembly includes a blade track carrier, a plurality of slots, a plurality of rails, an expansion ring, and a plurality of blade track segments. The blade track carrier has a top wall and a pair of sidewalls extending radially inward therefrom. The plurality of slots is formed in each sidewall of the blade track carrier. Each slot includes a first end located at a first radial position relative to an axis of rotation and a second end located at a second radial position outward of the first radial position. The plurality of rails are connected to each sidewall of the blade track carrier. Each rail has a bearing surface extending between a first end and a second end. The second end of the rail is positioned radially outward of the first end of the rail. The expansion ring is operably coupled with the slots of the blade track carrier. The plurality of blade track segments are operably coupled with the expansion ring and are engageable with the rails of the blade track carrier.

The turbine blade track assembly can further include a control system including an electronic controller, at least one temperature sensor, a source of cooling fluid, and at least one cooling fluid control valve. The at least one cooling fluid control valve controls the expansion and contraction of the temperature expansion ring and the radial location of each blade track segment.

According to another aspect of the present disclosure, a gas turbine engine includes a turbine blade track carrier, a plurality of through slots, a plurality of rails, an expansion ring, a plurality of bosses, a plurality of tabs, and a plurality of blade track segments. The turbine blade track carrier has a top wall and a pair of sidewalls extending radially inward from the top wall. The plurality of through slots are formed in the sidewalls of the blade track carrier. Each through slot extends circumferentially between first and second ends. The first end of each slot is positioned radially inward of the second end of each slot. The plurality of rails formed along the sidewalls of the blade track carrier. Each rail extends circumferentially between a first and second ends. The first end of each rail is positioned radially inward of the second end of each rail. The expansion ring has a platform extending between a pair of side walls. The plurality of bosses project radially outward from the platform of the expansion ring connectable with the slots of the blade track carrier. The plurality of tabs project radially inward from the platform of the expansion ring. The plurality of blade track segments are engageable with the rails of the blade track carrier and the tabs of the expansion ring.

The gas turbine can further include a temperature control system including an electronic controller, at least one temperature sensor, a source of cooling fluid, and at least one cooling fluid control valve. The at least one cooling fluid control valve is operable to define a radial position of each blade track segment.

According to yet another aspect of the present disclosure, a method for controlling turbine blade tip clearance includes a number of operations. The method including controlling a diameter of an expansion ring with a cooling fluid, moving the expansion ring in a circumferential direction as the diameter expands and contracts with a change in temperature, and moving a blade track in a circumferential direction with the expansion ring and guiding the blade track in a radial direction along a rail formed on a blade track carrier. The movement of the blade track segments can be defined by a spiral path.

While the invention has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and embodiment lacking the same may be contemplated as within the scope of the disclosure, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A turbine blade track assembly comprising
a blade track carrier having a top wall and a pair of sidewalls extending radially inward therefrom,
a plurality of slots formed in each sidewall of the blade track carrier, wherein each slot includes a first end located at a first radial position relative to an axis of rotation and a second end located at a second radial position outward of the first radial position,
a plurality of rails connected to each sidewall of the blade track carrier, each rail having a bearing surface extending between a first end and a second end, wherein the second end of the rail is positioned radially outward of the first end of the rail, wherein a path formed by each rail is a non-circular shape,
an expansion ring operably coupled with the slots of the blade track carrier, and
a plurality of blade track segments operably coupled with the expansion ring and engageable with the rails of the blade track carrier.

2. The turbine blade track assembly of claim 1, wherein the expansion ring moves in a first circumferential direction during expansion and in an opposite circumferential direction during contraction.

3. The turbine blade track assembly of claim 2, wherein each blade track moves in a circumferential direction in response to circumferential movement of the expansion ring.

4. The turbine blade track assembly of claim 2, wherein each blade track segment slidingly moves along a bearing surface of a corresponding rail as the blade track segment moves in a circumferential direction.

5. The turbine blade track assembly of claim 1, wherein each blade track segment moves radially inward and outward in response to the expansion ring moving radially inward and outward, respectively.

6. The turbine blade track assembly of claim 5, wherein each blade track moves in both a radial direction and a circumferential direction as each blade track moves along a path of a corresponding rail.

7. The turbine blade track assembly of claim 1, further comprising at least one fluid seal positioned between portions of the blade track assembly to substantially prevent fluid flow therethrough.

8. The turbine blade track assembly of claim 1, further comprising at least one impingement hole formed in the top wall of the blade track carrier, a plenum formed between the top wall of the blade track carrier and a platform of the expansion ring, wherein a cooling fluid enters the plenum through the at least one impingement hole, and at least one cooling feed hole formed through the platform of the expansion ring for directing cooling fluid from the plenum toward the blade track segments.

9. A gas turbine engine comprising
a turbine blade track carrier having a top wall and a pair of sidewalls extending radially inward from the top wall,
a plurality of through slots formed in the sidewalls of the blade track carrier, each through slot extending circumferentially between first and second ends, wherein the first end of each slot is positioned radially inward of the second end of each slot,
a plurality of rails formed along the sidewalls of the blade track carrier, each rail extending circumferentially between a first and second ends, wherein the first end of each rail is positioned radially inward of the second end of each rail, wherein a path defined between the first and second ends of each rail is in a form of a spiral,
an expansion ring having a platform extending between a pair of side walls,
a plurality of bosses projecting radially outward from the platform of the expansion ring connectable with the slots of the blade track carrier,
a plurality of tabs projecting radially inward from the platform of the expansion ring, and
a plurality of blade track segments engageable with the rails of the blade track carrier and the tabs of the expansion ring.

10. The gas turbine engine of claim 9, wherein each blade track moves radially inward and outward in response to radial contraction and radial expansion of the expansion ring, respectively.

11. The gas turbine engine of claim 9, wherein each blade track slidingly engages a corresponding rail of the blade track carrier such that movement along the rail is defined by both a radial direction and a circumferential direction.

12. The gas turbine engine of claim 9, further comprising a plurality of locating pins configured to couple the bosses of the expansion ring to the slots of the blade track carrier.

13. The gas turbine engine of claim 9, further comprising at least one wear member positioned between moveably engaged potions of a blade track assembly, and at least one seal positioned in a fluid flow path.

14. The gas turbine engine of claim 9, wherein each of the plurality of blade track segments includes a first wall, a second wall spaced apart from the first wall, and a bridge laterally extending between the first wall and second wall.

15. The gas turbine engine of claim 14, further comprising a plurality of compliant clips and each of the plurality of compliant clips is engageable with corresponding tabs of the expansion ring and corresponding bridge of one of the blade track segments.

16. A method for controlling a turbine blade tip clearance comprising
controlling a diameter of an expansion ring with a cooling fluid,
moving the expansion ring in a circumferential direction as the diameter expands and contracts with a change in temperature,
moving a blade track in a circumferential direction with the expansion ring and guiding the blade track in a radial direction along a rail formed on a blade track carrier, and
coupling the expansion ring to a circumferentially extending elongate slot formed in a wall of the blade track carrier.

17. The method of claim 16, wherein the slot is defined by a path that varies in radial position as a function of circumferential position.

18. The method of claim 16, wherein the rail is formed in a spiral path relative to a centerline of a gas turbine engine.

* * * * *